United States Patent [19]
Foti et al.

[11] Patent Number: 4,840,855
[45] Date of Patent: Jun. 20, 1989

[54] BATTERY LIFE EXTENDER

[76] Inventors: Michael Foti, 1919 Lenox Ave., East Meadow, N.Y. 11554; James Embry, 1930 S. Westwood #14, Mesa, Ariz. 85202

[21] Appl. No.: 174,184
[22] Filed: Mar. 28, 1988
[51] Int. Cl.4 .............................................. H01M 10/50
[52] U.S. Cl. ..................................... 429/120; 429/163
[58] Field of Search ...................... 429/120, 62, 71, 72, 429/163, 122; 432/225

[56] References Cited
U.S. PATENT DOCUMENTS

| | | | |
|---|---|---|---|
| 1,266,780 | 5/1918 | Edison | 429/62 |
| 1,313,512 | 8/1919 | Bedell et al. | 429/71 X |
| 1,363,889 | 12/1920 | Linebarger | 429/71 X |
| 2,666,091 | 1/1954 | Martin et al. | 429/120 |
| 3,837,918 | 9/1974 | Nakabayashi | 429/62 X |
| 4,095,938 | 6/1978 | Mikaila | 429/120 X |
| 4,126,734 | 11/1978 | Walters | 429/120 X |
| 4,255,502 | 3/1981 | Taylor | 429/120 X |
| 4,738,906 | 4/1988 | Sanders | 429/120 |

Primary Examiner—Anthony Skapars
Attorney, Agent, or Firm—Michael I. Kroll

[57] ABSTRACT

A battery life extender is provided and consists of a housing disposed around the battery with terminals of the battery extending through top of the housing so that battery clamps can be attached thereto and structure for stabilizing temperature of the battery within the housing during hot and cold weather conditions so as to extend operating life of the battery.

10 Claims, 1 Drawing Sheet

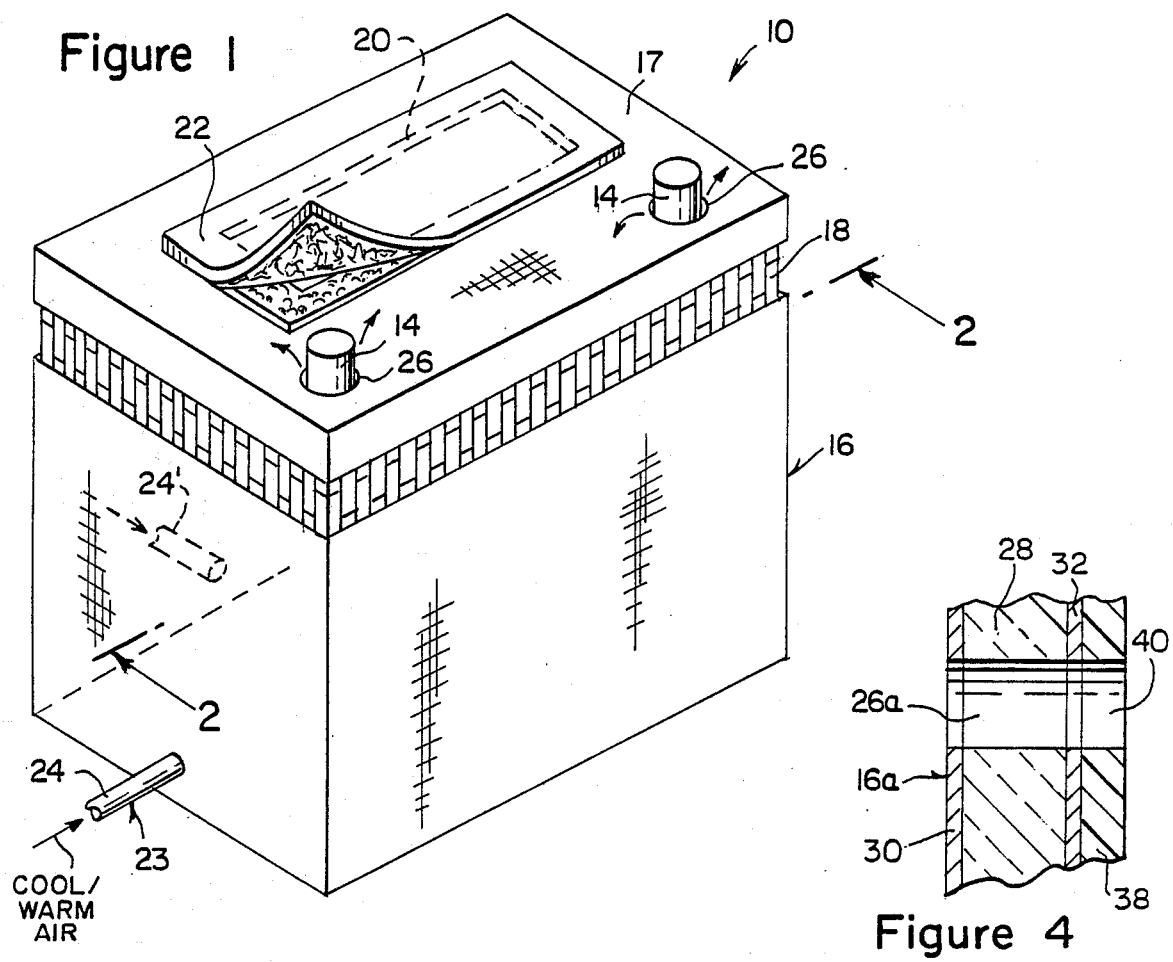
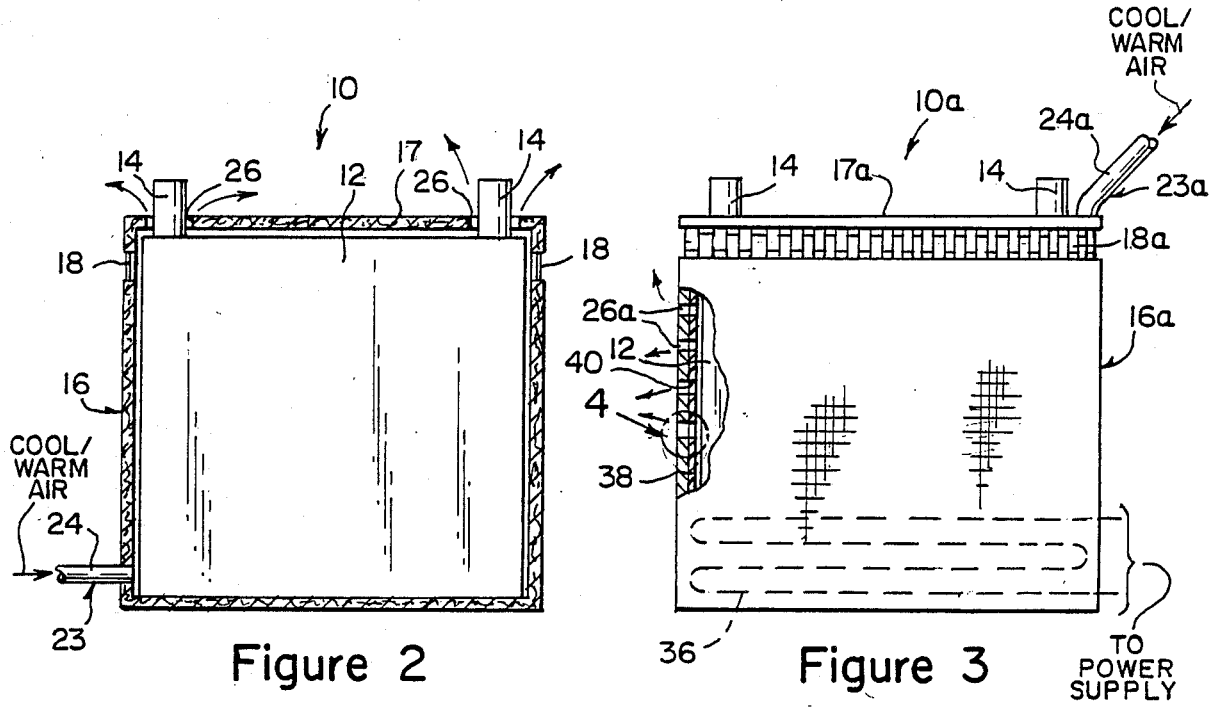

BATTERY LIFE EXTENDER

BACKGROUND OF THE INVENTION

1. Field of the Invention

The instant invention relates generally to battery boxes and more specifically it relates to a battery life extender.

2. Description of the Prior Art

Numerous battery boxes have been provided in prior art that are each adapted to carry store and protect a battery within a motor vehicle. While these units may be suitable for the particular purpose to which they address, they would not be as suitable for the purposes of the present invention as heretofore described.

SUMMARY OF THE INVENTION

A primary object of the present invention is to provide a battery life extender that will overcome the shortcomings of the prior art devices.

Another object is to provide a battery life extender that will supply cool and warm air through its housing to keep a battery at a constant temperature during hot and cold weather conditions so as to extend operating life of the battery.

An additional object is to provide a battery life extender that will supply heat through an electric heating coil in its housing to keep a battery warm during cold weather conditions so as to extend operating life of the battery.

A further object is to provide a battery life extender that is simple and easy to use.

A still further object is to provide a battery life extender that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a cross sectional view taken along line 2—2 in FIG. 1.

FIG. 3 is a front elevational view with parts broken away of a modification showing an alternate air cooling system and a heating element built within the housing.

FIG. 4 is an enlarged cross sectional view as indicated by numeral 4 in FIG. 3 showing the wall structure of the housing in greater detail.

DETAILED DESCRIPTION OF THE PREFERRED EMBODIMENTS

Turning now descriptively to the drawings, in which similar reference characters denote similar elements throughout the several views, FIGS. 1 and 2 illustrate a battery life extender 10 consisting of a housing 16 disposed around a battery 12 with terminals 14 of the battery 12 extending through top 17 of the housing 16 so that battery clamps (not shown) can be attached thereto. A structure 23 is provided for stabilizing temperature of the battery 12 within the housing 16 during hot and cold weather conditions so as to extend operating life of the battery 12.

A ZIPPER 18 is disposed around the housing 16 near top 17 thereof for allowing insertion of the battery 12 within the housing 16. The housing has an access opening 20 in the top 17 thereof for servicing the battery 12. A removable cover 22 is sized to fit over the access opening 20 in the top 17 of the housing 16. The ZIPPER 18 is fabricated out of durable non-corrosive material, such as nylon or the like while the housing 16 is fabricated out of durable insulating material, such as quilted nylon or the like.

The temperature stabilizing structure 23 includes an air inlet conduit 24 connected through the housing 16 for supplying cool air during hot weather conditions and for supplying warm air during cold weather conditions. The cool air can come from a motor vehicle air conditioner (not shown) while the warm air can come from a motor vehicle heater (not shown). The housing 16 has a plurality of air outlet vents 26 for allowing the air to exit the housing. The air inlet conduit 24 is located at one side of the housing 16 while the air outlet vents 26 are each located around one of the battery terminals 14. The air inlet conduit 24 can be optionally located at front or rear of the housing 16 as shown as 24 in FIG. 1.

FIG. 3 shows a modified battery life extender 10a wherein the air inlet conduit 24a is located at the top 17a of the housing 16a while the air outlet vents 26a are located at one side of the housing 16a.

As best seen in FIG. 4, the housing 16a further includes an outer wall layer 30 of waterproof material, an inner wall layer 32 of waterproof material and a center wall layer 28 of thick insulated material for protecting the battery 12 from ambient air thereabout. An inner sturdy casing 38 fabricated out of nylon or the like, that has air outlet vents 40, is placed between the housing 16a and the battery 12 to act as a stiffener and an additional barrier for the battery 12.

An electric heater coil 36, as shown in FIG. 3, is formed within the housing 16a to act as an additional temperature stabilizer for the battery 12 during the cold weather conditions.

The fabric used for the housing 16 and 16a will be acid proof or acid resistant or will be coated with an acid proof or acid resistant material—such as liquid rubber, etc.

One version of the invention (not shown) could have the temperature stabilizing structure 23 or 23a removed so that it could be sold at a lesser price. It would also help stabilize the temperature of the battery 12, if to a lesser degree. It may well be a very saleable product because of the lower price and the fact that it could be installed by the auto owner very simply. The invention with temperature stabilizing structure 23 or 23a would obviously require installation by an auto mechanic for most people and would cost more to manufacture. The market for these may be auto garages, auto dealerships, auto manufacturers, etc., where they can sell the product for an installed price. The simpler version could be marketed through parts houses to the general public, such as for a do-it-yourself person.

The battery 12 can be placed into a "hard box" inner cover (not shown), whereby it could save on acid problems and be attractive to the buyer because of its sturdiness. This box would be manufactured to fit each battery size.

LIST OF REFERENCE NUMBERS

10. Battery life extender
12. Battery
14. Battery terminal
16. Housing
17. Top of housing
18. Zipper
20. Access opening
24. Removable cover
23. Temperature stabilizing structure
24. Air inlet conduit
24'. Optional air inlet conduit
26. Terminal air outlet vent
28. Insulated center wall layer
30. Outer wall layer
32. Inner wall layer
36. Electric heating coil
38. Inner sturdy casing
40. Casing air outlet vent
10a. Modified battery life extender
16a. Housing
17a. Top of housing
18a. Zipper
24. Top air inlet conduit
26a. Housing air outlet vent It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is and desired to be protected by Letters Patent is set forth in the appended claims.

1. A battery life extender which comprises:
   (a) a housing disposed around the battery with terminals of the battery extending through top of said housing so that battery clamps can be attached thereto, said housing having an access opening in the top thereof;
   (b) means for stabilizing temperature of the battery within said housing during hot and cold weather conditions so as to extend operating life of the battery; and
   (c) a removable cover sized to fit over said access opening in the top of said housing so that the battery can be serviced without having to remove said housing or any part thereof.

2. A battery life extender as recited in claim 1, further including a ZIPPER disposed around said housing near top thereof for allowing insertion of the battery within said housing.

3. A battery life extender as recited in claim 1, wherein said ZIPPER is fabricated out of durable non-corrosive material.

4. A battery life extender as recited in claim 3, wherein said housing is fabricated out of durable insulating material.

5. A battery life extender as recited in claim 4, wherein said temperature stabilizing means includes:
   (a) an air inlet conduit connected through said housing for supplying cool air during hot weather conditions and for supplying warm air during cold weather conditions; and
   (b) said housing having a plurality of air outlet vents for allowing the air to exit said housing.

6. A battery life extender as recited in claim 5, wherein said air inlet conduit is located at one side of said housing while said air outlet vents are each located around one of the battery terminals.

7. A battery life extender as recited in claim 5, wherein said air inlet conduit is located at the top of said housing while said air outlet vents are located at one side of said housing.

8. A battery life extender as recited in claim 7, wherein said housing further includes:
   (a) an outer wall layer of waterproof material;
   (b) an inner wall layer of waterproof material; and
   (c) a center wall layer of thick insulated material for protecting the battery from ambient air thereabout.

9. A battery life extender as recited in claim 8, further comprising an inner sturdy casing having air outlet vents placed between said housing and the battery to act as a stiffener and additional barrier for the battery.

10. A battery life extender as recited in claim 9, further comprising an electric heating coil formed within said housing to act as an additional temperature stabilizer for the battery during the cold weather conditions.

* * * * *